(12) United States Patent
Ferrari

(10) Patent No.: US 10,104,250 B2
(45) Date of Patent: Oct. 16, 2018

(54) PREPRINTING METHOD AND SYSTEM OF SECURED INFORMATION FOR GAMING SYSTEM

(71) Applicant: Albiceleste Maritime Inc., Key Biscayne, FL (US)

(72) Inventor: Carlos Isidoro Ferrari, Ciudad Autonoma de Buenos Aires (AR)

(73) Assignee: ALBICELESTE MARITIME INC., Key Biscayne, FL (US)

( * ) Notice: Subject to any disclaimer, the term of this patent is extended or adjusted under 35 U.S.C. 154(b) by 27 days.

(21) Appl. No.: 15/021,887

(22) PCT Filed: Jun. 25, 2015

(86) PCT No.: PCT/US2015/037677
§ 371 (c)(1),
(2) Date: Mar. 14, 2016

(87) PCT Pub. No.: WO2016/209237
PCT Pub. Date: Dec. 29, 2016

(65) Prior Publication Data
US 2017/0041476 A1  Feb. 9, 2017

(51) Int. Cl.
*G07F 17/32* (2006.01)
*H04N 1/00* (2006.01)
(Continued)

(52) U.S. Cl.
CPC ....... *H04N 1/00774* (2013.01); *A63F 3/0655* (2013.01); *G07F 17/329* (2013.01);
(Continued)

(58) Field of Classification Search
CPC .......... H04N 1/00519; H04N 1/00774; H04N 1/00705; H04N 1/444; H04N 1/00771;
(Continued)

(56) References Cited

U.S. PATENT DOCUMENTS 6,773,348 B2  8/2004  Stockdale
7,510,116 B2  3/2009  Robb et al.
(Continued)

*Primary Examiner* — Eric A Rust
(74) *Attorney, Agent, or Firm* — Muncy, Geissler, Olds & Lowe, P.C.

(57) ABSTRACT

Disclosed is a preprinting system of secured information connected to a game host device. The preprinting system includes a controller, a printer, a plurality of printer detectors, a housing, a plurality of housing detectors. The controller is configured to communicate with the game host device, and to receive a game information signal and a status checking request signal. The printer is electronically connected to the controller, which is configured to print a game draw of the game program on printable medium, and the printed printable medium is partially revealed to the player while the game result draw thereon is unknown to the player. By preprint game draw of the game program, the possibility of adulteration from the game system is eliminated, the preprinting system also provides reliability, and the verification mechanism provides information security of digital chance games to the players. An preprinting method of secured information is also disclosed.

20 Claims, 12 Drawing Sheets

(51) Int. Cl.
  *G07G 5/00* (2006.01)
  *A63F 3/06* (2006.01)
  *H04N 1/32* (2006.01)
  *H04N 1/44* (2006.01)

(52) U.S. Cl.
  CPC ........... *G07F 17/3246* (2013.01); *G07G 5/00* (2013.01); *H04N 1/00705* (2013.01); *H04N 1/00771* (2013.01); *H04N 1/32272* (2013.01); *H04N 1/444* (2013.01); *A63F 2250/58* (2013.01)

(58) Field of Classification Search
  CPC .............. H04N 1/32272; G03B 21/145; G07F 17/3246; G07F 17/329; A63F 3/0655; A63F 2250/58; G07G 5/00
  USPC .................. 353/119; 358/1.15, 305; 399/380
  See application file for complete search history.

(56) References Cited

U.S. PATENT DOCUMENTS

| | | | |
|---|---|---|---|
| 9,997,025 B2* | 6/2018 | Anderson | G07F 17/3267 |
| 2003/0099476 A1 | 5/2003 | Minakuchi et al. | |
| 2004/0132529 A1 | 7/2004 | Mkrtchyan et al. | |
| 2005/0057633 A1 | 3/2005 | Meyerhofer | |
| 2005/0082735 A1* | 4/2005 | Nakamura | B65H 5/26 271/1 |
| 2006/0033261 A1 | 2/2006 | Hilbert | |
| 2018/0012453 A1* | 1/2018 | Anderson | G07F 17/3225 |

* cited by examiner

PREPRINTING METHOD AND SYSTEM OF SECURED INFORMATION FOR GAMING SYSTEM

BACKGROUND OF THE INVENTION

1. Field of the Invention

The disclosure relates to a preprinting method and system of secured information for gaming system. More particularly, the disclosure relates to a preprinting method and system of secured information for gaming system that eliminate the possibility of adulteration from the gaming system and provide reliability and information security of digital chance games to the players.

2. Description of the Related Art

Games of chance are often designed based on the assumption of the equal likelihood of events. For example, in general card games, all cards are picked from a deck, most would say that one card, for example the three of clubs, is just as likely to be chosen as any other card, such as the eight of diamonds. Experience has shown that actually all cards are equally likely to be chosen from a well shuffled deck, so that the possibility are the same for every players in the card game.

Games of chance based on electronic devices are widely known. During the processing of these games, each of the processing steps is monitored by computer programs which can be designed to favor the computer itself.

In the hand shuffling or manual distribution of cards, unfair play is even more likely to occur by intentional cheating or unavoidable error. Take black jack for example, it is played with a standard deck, by two or more persons, against a dealer (banker). To begin with, each player is dealt one card face down and makes his bet. He then receives a card face up. He may "hold" with two cards or draw more, one at a time. If he goes over 21, he pays the dealer. The dealer draws last and only loses to hands closer to 21 than his own. Two cards totaling 21 form a "natural", or "blackjack", for which the dealer either collects or pays double. The game will therefore be readily acknowledged that all the game draws is fair and inevitably leave the game open to intentional cheating or unintentional error by the computer or staff making black jack and similar games of chance inherently unfair.

However, as long as the cards games are utilized, a certain form of cheating like cooperation between the dealer and one of the players is possible with regard to intentional cheating, such that a fair card game may not be achieved, or at least a player can never be sure that the card game in which he is participating is fair. Therefore, a gaming system and method with the guarantee of the existence of winning combination before any selection that is made by the player is needed, and the information security mechanism is also required in the same system and method.

SUMMARY OF THE INVENTION

In view of the aforementioned existing technical problems, one objective of the present invention is to provide an information securing and preprinting gaming system and method.

According to the objective of the present invention, a preprinting system of secured information connected to a game host device, which is configured to execute a game program. The preprinting system includes a controller, a printer, a plurality of printer detectors, a housing, and a plurality of housing detectors. The controller is configured to communicate with the game host device, and to receive a game information signal and a status checking request signal from the game host device. The printer is electronically connected to the controller, which is configured to be controlled by the controller to print a game draw of the game program on printable medium stored therein, and the printed printable medium is partially revealed to the player while the game draw thereon is unknown to the player. The plurality of the printer detectors are disposed on the printer and are electronically connected to the controller, and the controller is configured to control the plurality of the printer detectors to check the position of the printable medium according to the status checking request signal. The housing is disposed to enclose the printer to protect the printer from exterior forces while revealing a part of the printed printable medium. The plurality of the housing detectors are disposed between the printer and the housing and are electronically connected to the controller, and the controller is configured to detect any unexpected opening of the housing by the plurality of the housing detectors, the controller transmits a confirm signal to the game host device if the printable medium is correctly printed and the housing is kept closed, then at least one game draw of the game program is generated after the game host device receives the confirm signal, and the controller is configured to receive the at least one game draw to control the printer to print the game draw on the printable medium before a game associated to the at least one game draw is started, after the game is finished, the controller is configured to control the printer to eject the printed printable medium according to the game information signal and to terminate the game.

Preferably, the controller is configured to determine whether the position of printed printable medium is correct in real time through the plurality of the printer detectors.

Preferably, the controller may be configured to determine whether the position of the housing is correct in real time by the plurality of the housing detectors, if "No", the controller is configured to set the preprinting system into a lock state which may be polled by the game host device to change the game play status.

Preferably, the preprinting system may further include a memory unit, which is configured to store records generated by the plurality of the printer detectors and the housing detector.

Preferably, the printed printable medium may be a ticket, and the records comprising a unique ticket ID, a ticket type, and life time of the ticket.

Preferably, the records may include data of the plurality of the printer detectors and the plurality of the housing detectors.

Preferably, the preprinting system may further include a battery unit, which is configured to supply power to the printer detectors, the housing detector, and the controller memory if a power supply for the preprinting system from outside is interrupted.

Preferably, data transmission between the game host device and the controller may be configured to be encrypted by the game host device and the controller.

Preferably, the housing may further include an armor with a lock door and a cover, the cover is openably disposed on the printer, and the armor is movably disposed outside of the printer and the cover to protect the printer and the cover.

According to another objective of the present invention, a preprinting method of secured information for a gaming system applicable to the preprinting system of secured information of the present invention, the method comprises following steps: using the controller to communicate with the game host device and receive the game information signal and the status checking request signal; using the controller to control the plurality of printer detectors to detect a position of the printable medium according to the status checking request signal; using the controller to control the plurality of the housing detectors to detect any unexpected opening of the housing; using the controller to transmit a confirm signal if the printable medium is correctly printed and the housing is kept closed, and then at least one game draw of the game program is generated after the game host device receives the confirm signal; using the controller to receive the at least one game draw to control the printer to print the game draw on the printable medium before a game associated to the at least game draw is started, and the printed printable medium being partially revealed to the player while the game draw is unknown to the player; using the controller to control the plurality of printer detectors to detect a position of the printed printable medium according to the status checking request signal; using the controller to control the printer to eject the printed printable medium according to the game information signal after the game is finished.

Preferably, the controller may be configured to determine whether the position of printed printable medium is correct in real time through the plurality of the printer detector.

Preferably, the controller may be used to determine whether the position of the housing is correct in real time by the plurality of the housing detectors after the game draw is printed, if "No", the controller is configured to transmit an error signal to the game host device, and the game program executed by the game host device goes to an error condition immediately according to the error signal.

Preferably, the preprinting system may further comprising a memory unit, which is configured to store records generated by the plurality of the printer detectors and the housing detector.

Preferably, the printed printable medium may be a ticket, and the records comprising a unique ticket ID, a ticket type, and life time of the ticket.

Preferably, the records may include data of the plurality of the printer detectors and the plurality of the housing detectors.

Preferably, the preprinting system must include a battery unit, which is configured to supply power to the security printer device without connecting to power.

Preferably, data transmission between the game host device and the controller may be configured to be encrypted by the game host device and the controller.

Preferably, the housing may further include an armor with a lock door and a cover, the cover is openably disposed on the printer, and the armor is movably disposed outside of the printer and the cover to protect the printer and the cover.

Preferably, the plurality of the housing detectors may further include a lock detector configured to detect a locking status of the lock, an armor detector configured to detect an armor position, and a cover detector configured to detect a cover position.

As the aforementioned description, the present invention provides an information securing gaming system and method with can guarantee of the existence of winning combination before any selection that is made by the player, and the information security mechanism is also exist in the same system and method.

DETAILED DESCRIPTION OF THE PREFERRED EMBODIMENTS

Figure 1:
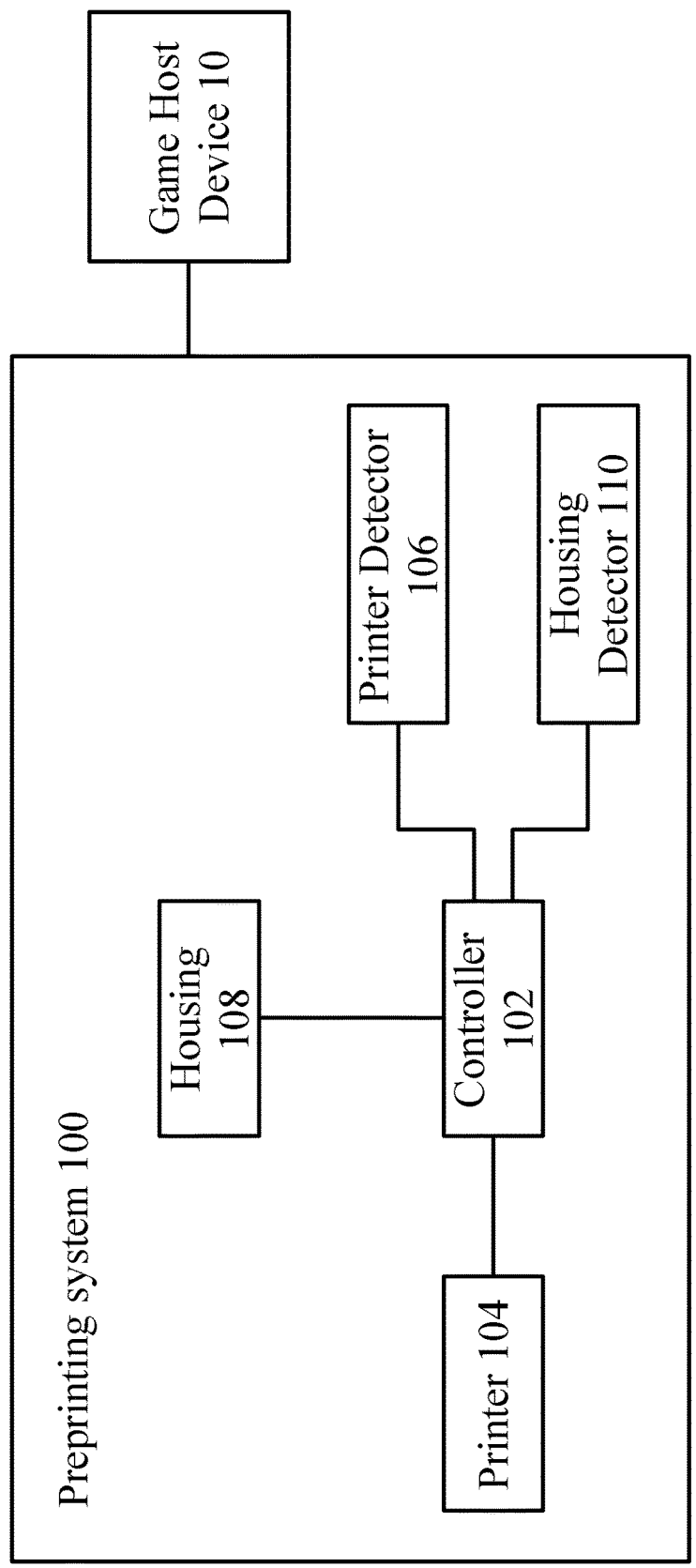
FIG. 1 is a block diagram schematically illustrating a first exemplary embodiment of the preprinting system of secured information of the present invention.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM,DVD-ROM, paper card and paper tape, and the like) and other known types of program memory.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram schematically illustrating a first exemplary embodiment of the preprinting system of secured information of the present invention. As shown in FIG. 1, an preprinting system 100 is connected to a game host device 10. The preprinting system 100 includes a controller 102, a printer 104, a plurality of printer detectors 106, housing 108, a plurality housing detectors 110.

The controller 102 is configured to communicate with the game processor, and to receive a game information signal and a status checking request signal from the game host device. The plurality of the application games are easy to understand for familiarize the public with the preprinting system of secured information 10. The preprinting system 100 is a human interface device, commanded through a secure protocol, to print and present a ticket in a secure way. In order of that, the preprinting system 100 accepts text and graphic and prints the information on a paper which will be protected safely in a presenter, until a eject command is received. If any kind of intrusion was detected when the ticket is on the presenter, the device will report the event, and changes its status to a violation status.

The plurality of application games executed by the game host device 10 are also similar to the well-known and accepted by the public. Moreover, possibility of different rewards, such as jackpots in different application games may be accumulated, and the possibility of winning the jackpot may be accumulated between a certain amount of game host devices in a small locality, a great city, or a capital city.

The controller 102 may be, but not limited to, central processing unit, microcontroller, etc., and is configured to communicate with the game host device directly through the network. The preprinting system 100 and the game host device may both include a transceiver, which is configured to be controlled by the controller 102 to transmit and receive the game information therebetween. Wired or wireless communication links may be established between the transceivers. The transceiver may generate a radio frequency alternating current, which is applied to the antenna. When excited by alternating current, the antenna radiates radio waves. In addition to their use in broadcasting, transceiver are necessary component parts of many electronic devices that communicate by radio, such as cell phones, wireless computer networks, Bluetooth enabled devices, garage door openers, two-way radios in aircraft, ships, and spacecraft, radar sets, and navigational beacons.

The game host device 10 is configured to provide the player to input a controlling signal therethrough and to transmit the controlling signal to a game processor. Here, a controlling interface of the game host device may include, but not limit to, a display, a touch panel, a keyboard, and a mouse. Preferably, the controlling interface may be a touch panel with a display disposed interior. The display may be a TFT LCD monitor with touch screen, it may also be replaced by cathode ray tube (CRT) or flat CRT. The controlling interface displays the game screen of the game program executing by the game processor, the game screen may include virtual bottoms, such as "start", "play", and "bet" for the players to input the controlling signal.

The host game device 10 is configured to execute the gaming program according to the controlling signal, that is, after the player pushes the start button, the gaming program may be executed by the game processor. In other situation, due to the gaming program may be comprised of a plurality of application games, the players may use the controlling interface to choose one of the plurality of application games to play.

The printer 104 is electrically connected to the game processor 102 and configured to be controlled by the game processor 102 to print a game draw of at least a round of the gaming program on printable medium stored in the printer 104, and the printed printable medium is partially revealed to the player while the game draw is unknown to the player. Here, the printer 104 may be implemented as a presenter for indicating that the game draw is preprinted before a round of the game started, the game draw may be a sequence, a bet, or a option associating to drawing type of games. The printer 104 is adapted for printable medium of considerable weight and incorporated self-cutter, and the printer 104 includes a thermal head which may be capable of self-feeding with printable medium and cutting printable medium. Moreover, the printer 104 may include an input slot for the printable medium, such as paper, which is easy to access and a receptacle where the scroll of paper is located, and the input slot and the receptacle should be designed in a way that the access and paper replacement can be easy to perform for non-experienced personnel. In addition, the printer 104 may include a exhibitor, which has a mechanic control of the paper throughout all its length, thus the printer 104 is able to print on papers of different sizes depending on the type of printable medium, and the printer 104 should have fishing protection to keep the paper from going the opposite way.

The printable medium is used as tickets or game coupons associated to the game program, these coupons are printed in the printable medium, such as sensible thermos paper. Note that all tickets and game coupons express information such as day, time, number of game host device, and a bar code that corresponds with the detail of the game coupon individualizing it among all the possible ones of the different qualified application games in the game program. For safety reason, safety measurements can be preprinted by offset on the paper, such as the logo of the company, related resolutions, prohibitions, laws, drawing of non-winning coupons, water seals, and preimpression of visible isotopes to the ultraviolet light. The printer 104 can print regular coupons and secure coupons. For regular coupons the device can use a non-crypto protocol, but secure tickets only can be printed using the secure protocol defined in the present specification.

The housing 108 is disposed to enclose the printer 104 to protect the printer 104 from the external force while a revealed part of the printed printable medium is visible to the player. The housing 108 of the device is protected inside of a shielded box, that can only be disassembled by using a unique key, the device has a sensor to detect if the lock is opened, also has a sensor to detect if the armor was opened, the detail description is described hereinafter.

The plurality of housing detectors 110 are disposed between the printer 104 and the housing 106 and electronically connected to the controller 102, and the controller 102 is configured to detect any unexpected opening of the housing 108 by the plurality of housing detectors 110. Note that the controller 102 is configured to determine whether the position of the housing 106 is correct in real time by the plurality of the housing detectors 110, if "No", the controller 102 is configured to transmit a lock signal to the game host device 10, and the game program executed by the game host device 10 goes to an error condition immediately according to the lock signal.

The preprinting system 100 may also include a plurality of printer detectors 106, which is disposed on the printer 104 and are electronically connected to the controller 102, and the controller 102 is configured to control the plurality of the printer detectors 106 to check the position of the printable medium according to the status checking request signal. Moreover, a plurality of housing detectors may also be disposed between the printer 104 and the housing 108, and are electronically connected to the controller 102. The controller 102 is configured to control the plurality of the housing detectors to detect any unexpected opening of the housing 108. Moreover, the controller 102 of the printer 104 is configured to determine whether the position of printed printable medium is correct in real time through the plurality of the printer detectors 106, if "No", the controller is configured to transmit an error signal to the game host device 1, and the game program executed by the game host device 1 goes to an error condition immediately according to the error signal.

In addition, the controller 102 transmit a confirm signal to the game host device 10 if the printable medium is correctly printed and the housing 108 is closed, then at least one game draw of the game program is generated after the game host device 10 receives the confirm signal, and the controller 102 is configured to receive the at least one game draw to control the printer 104 to print the game draw on the printable medium before a game associated to the at least one game draw is started. After the game is finished, the controller 102 is configured to control the printer 104 to eject the printed printable medium according to the game information signal.

Figure 2:
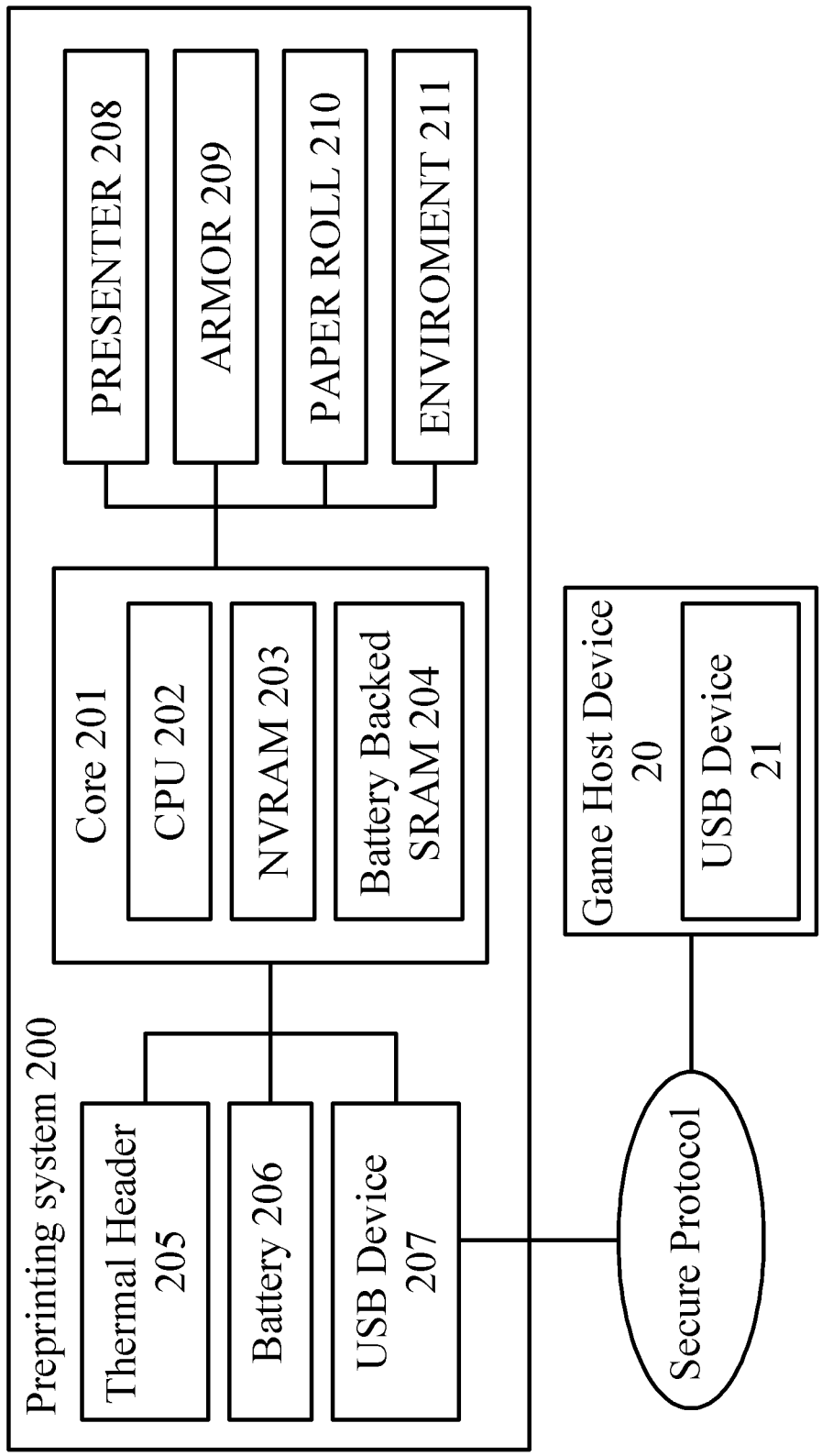
FIG. 2 is a block diagram schematically illustrating a second exemplary embodiment of the preprinting system of the present invention.

Please refer to FIG. 2, which is a block diagram schematically illustrating a second exemplary embodiment of the preprinting system of the present invention. As shown in FIG. 2, the preprinting system may include a core 201, thermal header 205, a battery 206, a USB device 207, a presenter 208, a armor 209, a paper roll 210, and an environment 211. The preprinting system 200 is connected to the game host device 20 with another USB device 21. The data transmission between the preprinting system 200 and the game host device 21 is configured to be encrypted by the game host device and the controller, that is, the secure protocol 22. A communication stack of the secure protocol is defined for a three-layer protocol, there are Physical layer, Encryption layer and Command layer. The communication protocol for the printer 104 is used over a USB channel (between USB device 207 and 21), so it can be used in a multi platform environment without requiring specific drivers.

Here, the printer 102 and the printer detectors 106 described before may include partial functions of the thermal header 205, the presenter 208, and the paper roll 210 in the present embodiment. In detail, the thermal header 205 may include a paper sensor for detecting amount and preset status of the printable medium stored in the printer 102. Moreover, the thermal header 205 also includes a header overheat sensor, a header open sensor and cutter & cutter state sensor to supervise the thermal header of the printer 102.

The preprinting system 200 also has an internal battery 206, to stay alert even if is unplugged. This battery 206 keeps the electronics powered in sleep mode, such that sensing is always performed with regard to the disassemble sensors, and the paper sensor if a secure ticket is in the presenter (printer 104). The internal battery 206 prevents to sense all functional sensor, under conditions of power failure, and if the battery gets down, the state machine will be erased and will be locked on the next power on.

In the embodiment, the core 201 corresponds to the controller 102 mentioned before, which includes a NVRAM and a SRAM. The NVRAM is used to store graphics, fonts, templates of the tickets and game coupons, and the SRAM is a memory unit for storing the running program of the game controller, the current status, the ticket information and all the records generated by the printer detectors 106 and the housing detectors 110.

Note that the plurality of the printer sensor 106 may further include the presenter 208 and the paper roll 210. The presenter 208 is assigned to sense an outer door part for ejecting the printed printable medium of the printer 104, including paper sensors, a mouse sensor, and a door sensor for supervising the ejection of the paper. The paper roll 210 is assigned to supervise a near end of the paper by using a near end sensor and a paper end sensor, which will be described in more detail hereinafter.

The armor 209 is disposed to implement functions of the housing detectors 110 described before. The armor 209 may include an armor sensor, a locker sensor, and a cover sensor, which will be described with accompany drawings.

Figure 3A:
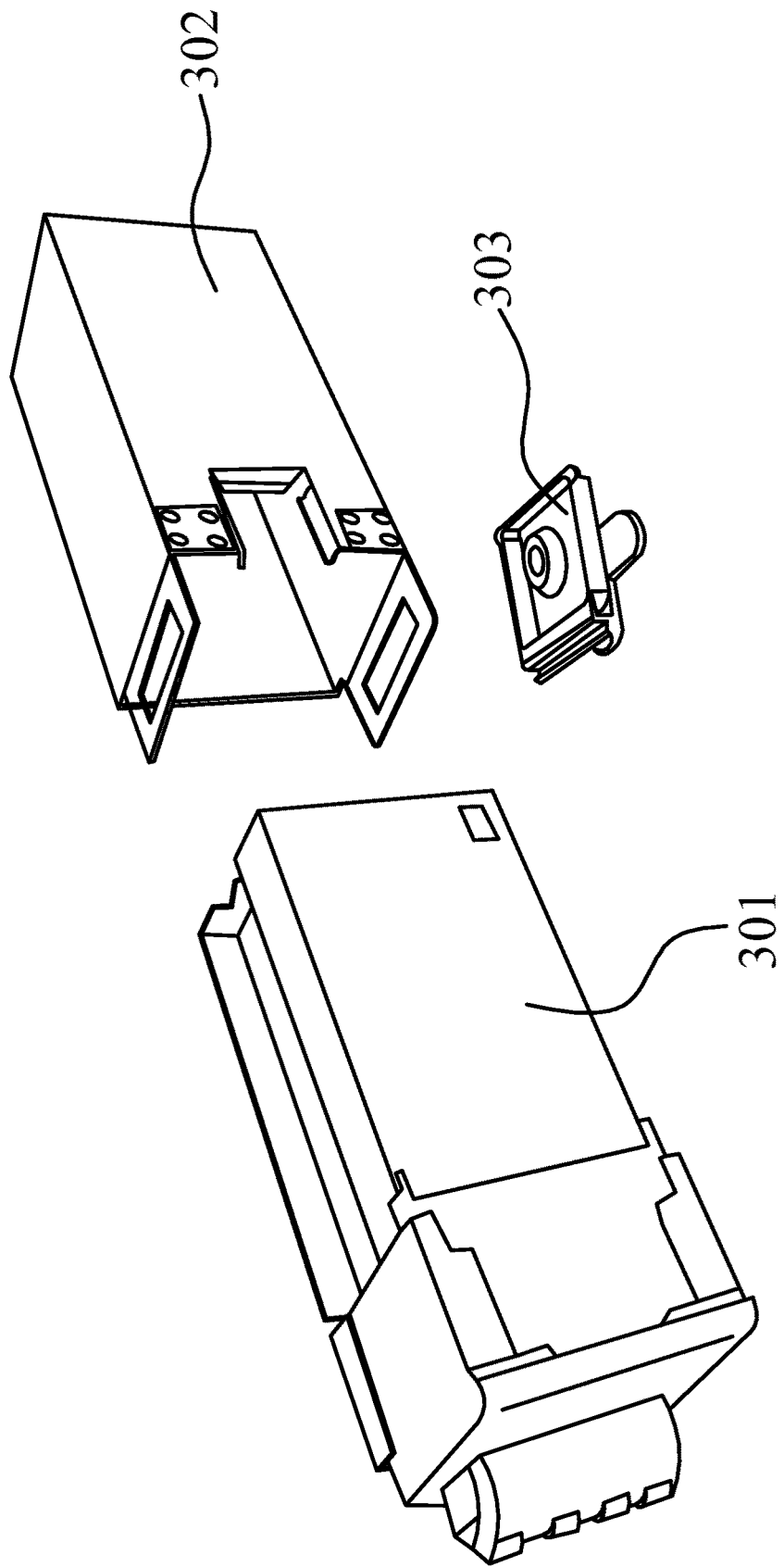
FIGS. 3A to 3C are perspective views of the printer and the housing of the preprinting system of the present invention.
Figure 3B:
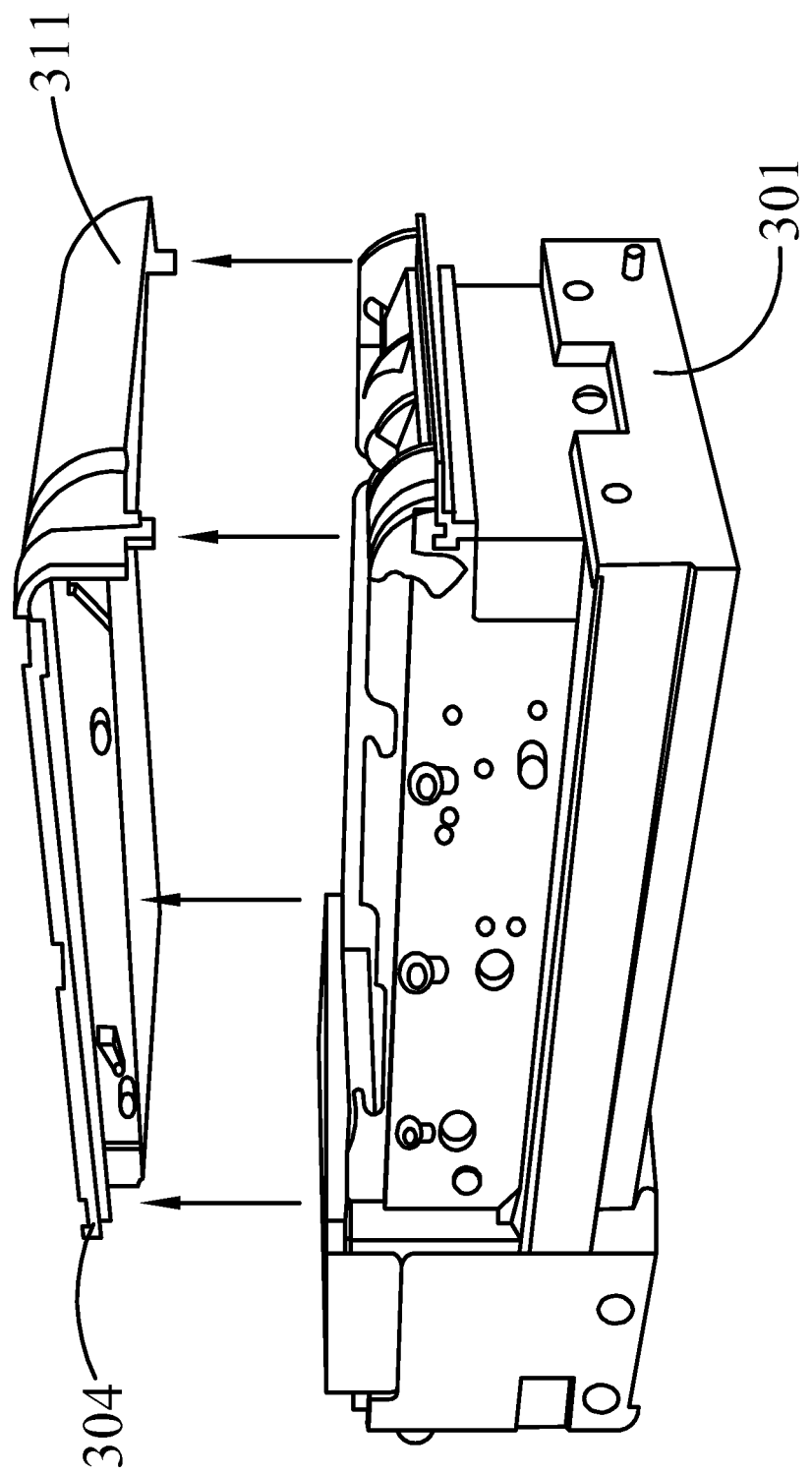
Figure 3C:
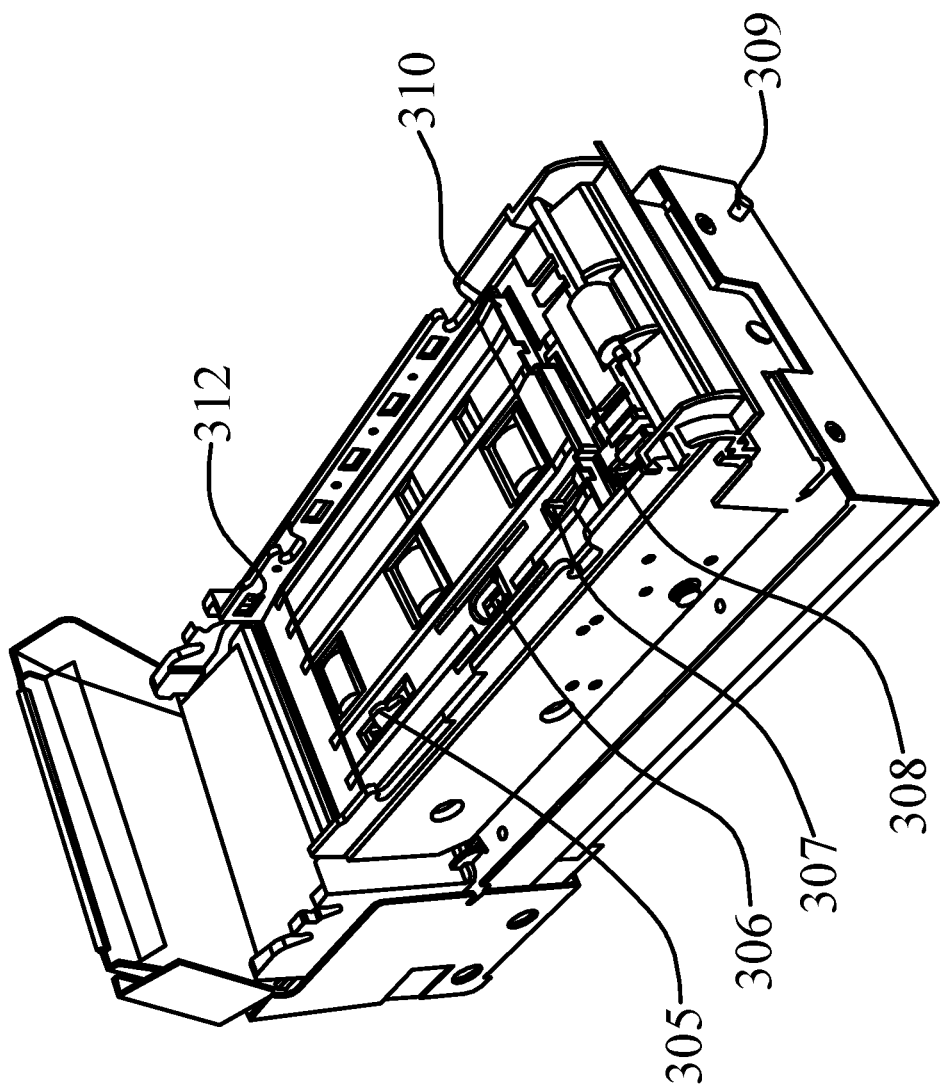

FIG. 3A to 3C are perspective views of the printer and the housing of the preprinting system of the present invention. Please refer to FIG. 3A, the preprinting system may be divided into armor 302 and printer 301. All the electronic parts, and mechanical parts that can influence the logical or mechanical safety, are enclosed in a metal shield with a lock 303. The paper input slot, presenter cover window, and paper output slot, are the only parts that can be seen outside of the armor. The armor 302 and armor sensor 309 allows the removal of the preprinting system from inside the game host device, without compromising the safety.

The housing 108 may further include a cover 304 and a window 311, and is configured to allow a coupon on the printer 301 may be see partially, and works as a shield to prevent the mechanical access to the ticket. The window 311 may be fabricated by glass, and holds a thin sheet made of metal, for hiding a part of ticket. The cover 304 may only be removed when the armor 302 is out, as shown in FIG. 3B. The preprinting system may also have a cover sensor 312, to detect the presence of the cover 304.

In FIG. 3C, the paper door is disposed on the surface of the printer 301, which is the last mechanical shield of the printer 301, to prevent insertion of elements from the output slot, compromising the safety of ticket.

With the purpose of keeping in a persistent way the information current status of the preprinting system, the SRAM 204 memory is erased by the first startup or after battery dead, the state machine starts in a locked status, and all locked status only can be removed with a special software who needs a specific keys for any kind of lock. It allows create specific privileges to any kind of user, to unlock several levels of lock.

The top level of the locking status of the preprinting system, are the disassemble locks status, produced when a disassemble sensor was halted, such as the lock sensor (next to the lock 303), the armor sensor 309 and the cover sensor 304. The subsequent lock status are the violation lock, produced when the any of the paper sensor (such as paper sensors 305-308) was halted unexpectedly, when a secure ticket was printed. The next lock status are the environmental locks followed by the paper jam locks, produced when paper gets jammed under normal operation.

Figure 4:
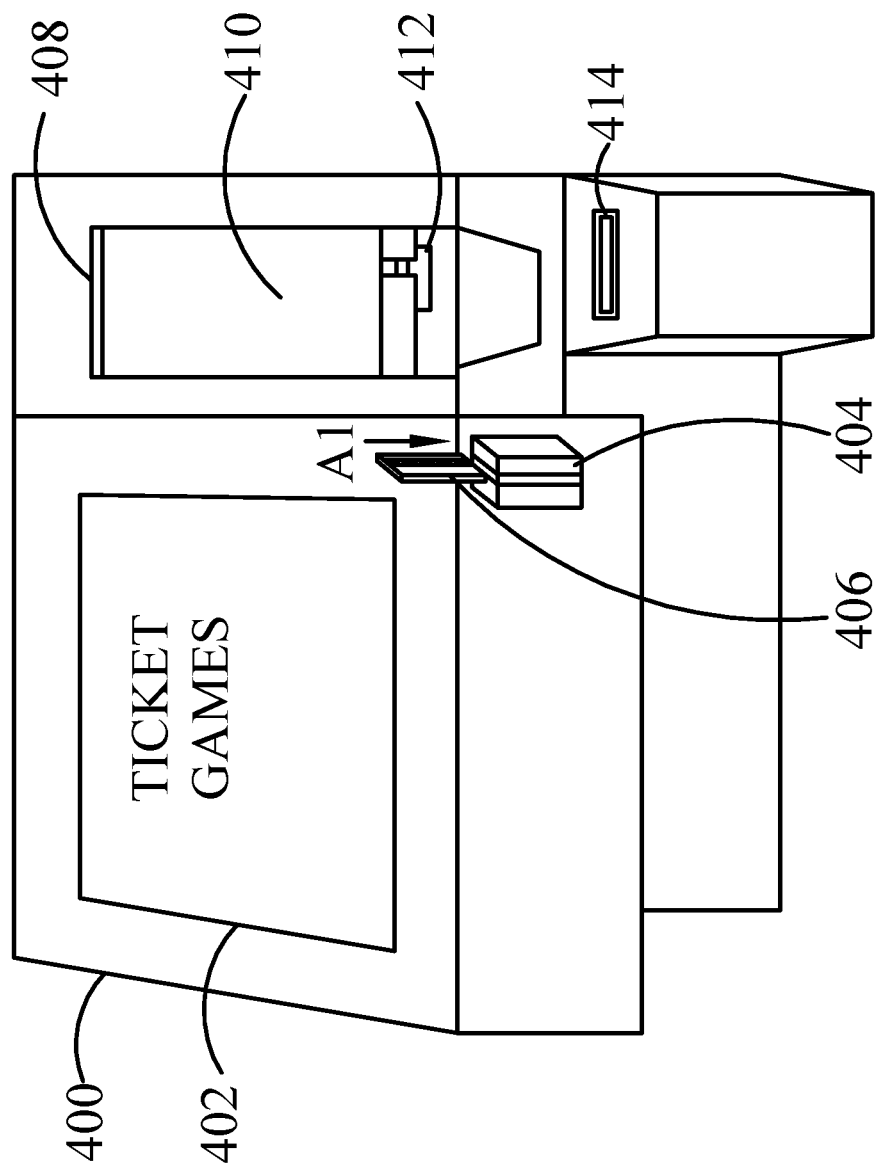
FIG. 4 is a representative perspective view of a game host device and the preprinting system according to the present invention.
Figure 5A:
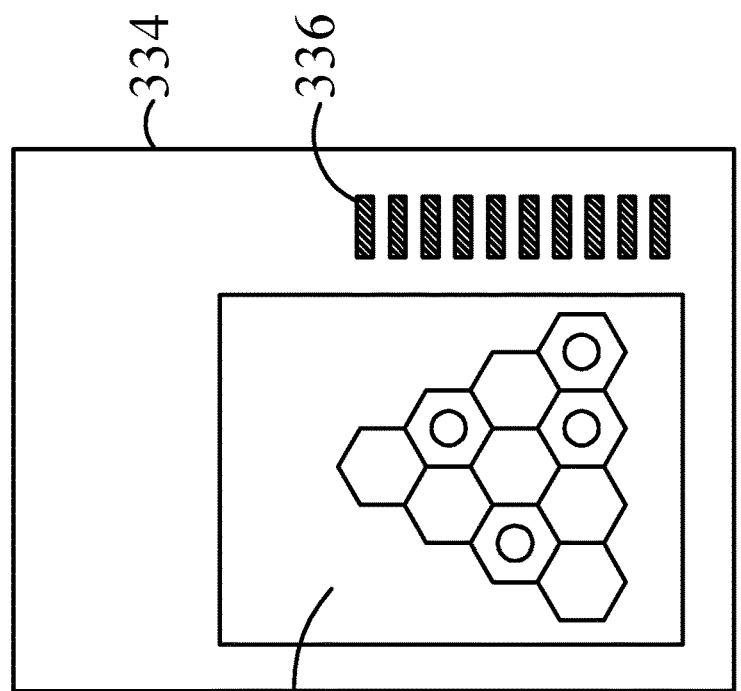
FIGS. 5A to 5C are schematic diagrams schematically illustrating the exemplary embodiments of the game screen and the printed printable medium.
Figure 5A:
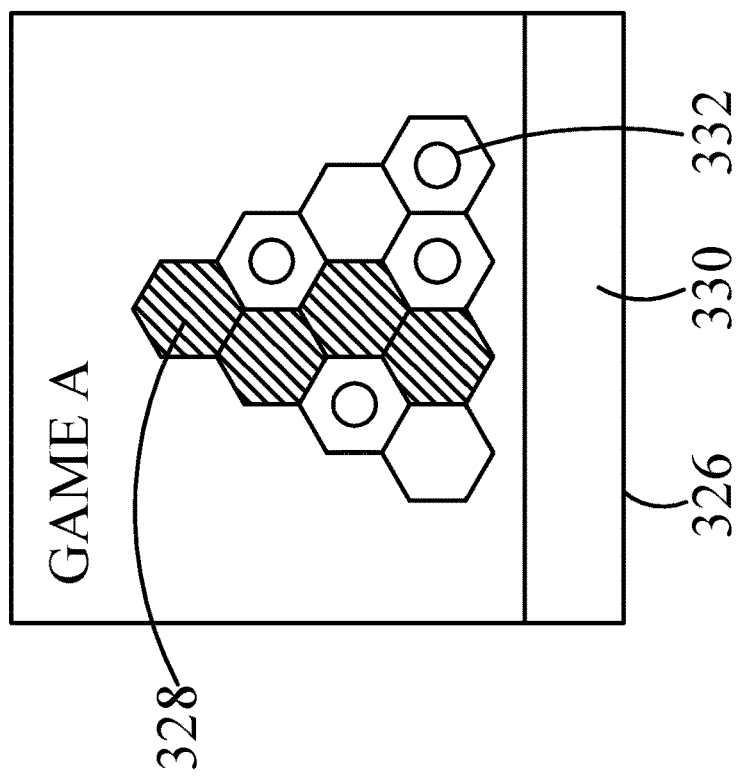

FIG. 4 is a representative perspective view of a game host device and the preprinting system according to the present invention. In the FIG. 4, the game host device 400 is illustrated according to the first and the second exemplary embodiments of the information securing and preprinting system of the present invention. The game host device 400 is set as FIG. 5A and includes a game screen 402, a card reader 404, a bill validator slot 414, a preprinting system 408, a housing 410, and an output slot 412. The game screen 402 corresponds to the controlling interface, the card acceptor 404 corresponds to the identification device, the preprinting system 408 corresponds to the preprinting system 100 and 200, therefore the repeated description should be omitted. In FIG. 4, the player may first use the game screen to start the game host device 400 and choose one game from the plurality application games, and insert the identification information 406 followed the arrow A1 to the card acceptor, after the game host device 400 have confirmed the identification information 406 of the player, the player may insert cash into the cash slot 414 to transfer the credit associated to the selected game.

Figure 5B:
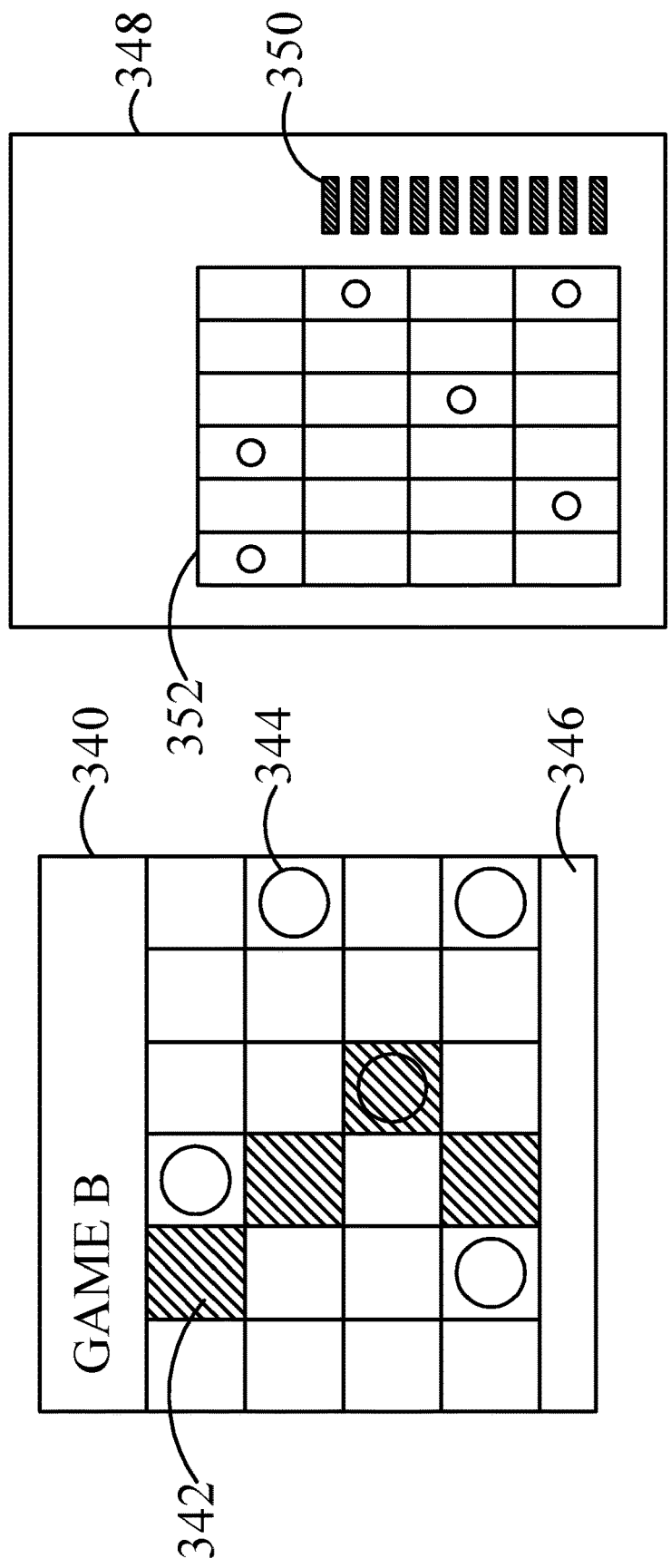

Now turning to FIG. 5B, after the player is ready to start a round of the game, the game host device 400 check the status of the preprinting system 408 firstly. A checking status request signal is generated and transmitted to the controller of the preprinting system 408. Please turn to FIG. 6, which is a checking flow between the game host device 400 and the preprinting system 408. In the upper part of FIG. 6, the game host device 400 may check the status of the preprinting system 408 anytime, and the status must be checked to be ready before printing. That is, the controller of the preprinting system 408 is configured to determine whether the position of the housing is correct in real time by the plurality of the housing detectors, if "No", the controller is configured to transmit a error signal to the game host device 400, and the game program executed by the game host device 400 throws the exception immediately according to the error signal. Moreover, the controller of the preprinting system 408 is also configured to determine whether the position of printed printable medium is correct in real time through the plurality of the printer detectors.

After the status of the preprinting system is checked, the game host device 400 generate at least one game draw of the game program after the game host device receives the confirm signal, a secure transaction is configured to be started, and the controller of the preprinting system 408 is configured to receive the at least one game draw to control the printer to print the game draw on the printable medium before a game associated to the at least one game draw is started.

Figure 6:
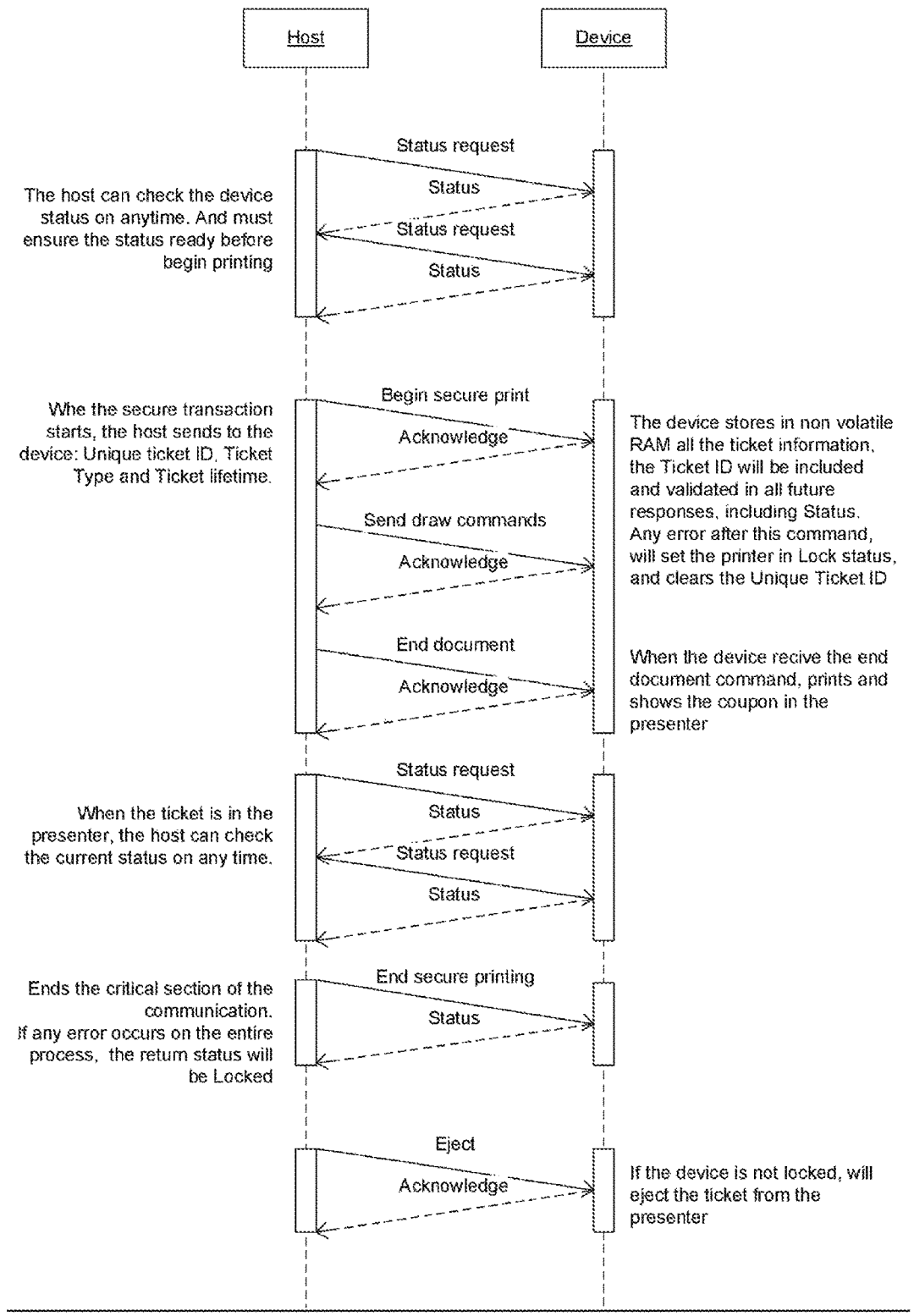
FIG. 6 is a checking flow between the game host device and the preprinting system.

In this part, please refer to the middle portion of FIG. 6, when the secure transaction starts, the game host device 400 sends an unique tick ID, a ticket type, and a ticket lifetime associated to the at least game draw to the controller of the preprinting system 408 (draw commands), and the memory unit of the preprinting system 408 is configured to store all the ticket information. Any error after the command will set the preprinting system 408 into locking status, and the unique ticket ID stored in the memory unit will be erased. Preferably, the game host device 400 may be configured to send an end document command after the draw command is sent, and the printer is configured to print the draw of a game and to show a part of the printed printable medium, as shown in FIG. 4.

Preferably, bar codes of the printed printable medium 412 are partially showed to the player. After the player finished the round of the game, the game host device 400 confirms whether the round is finished correctly. If the finishing verification is passed, the printed printable medium is ejected by a printer. In the lower part of FIG. 6, the printer detectors is configured to sense any unexpected movement of the printable medium, and the housing detectors is configured to sense any unexpected opening of the armor 410.

Figure 5C:
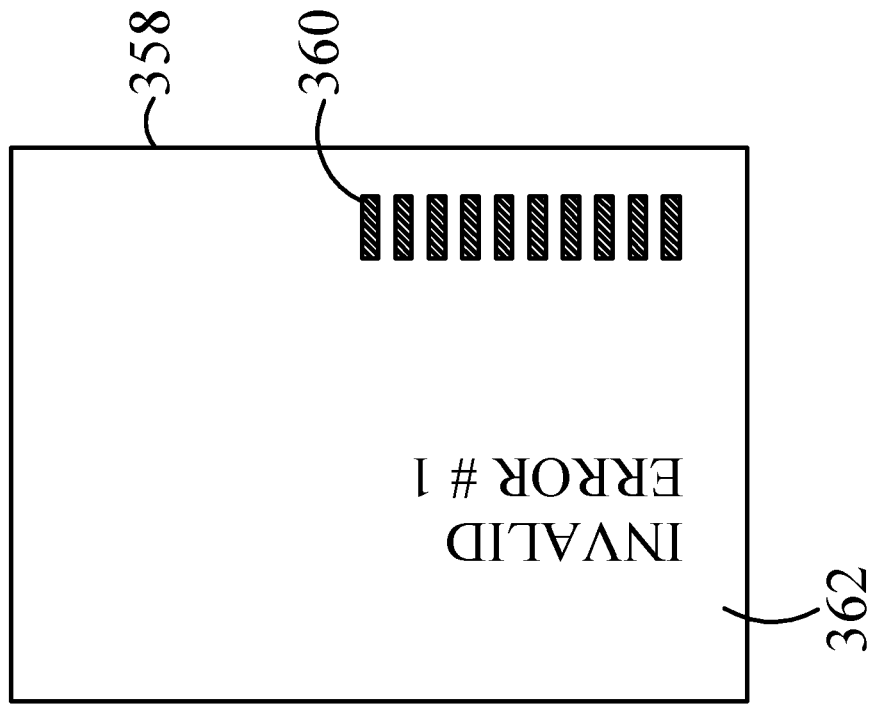
Figure 5C:
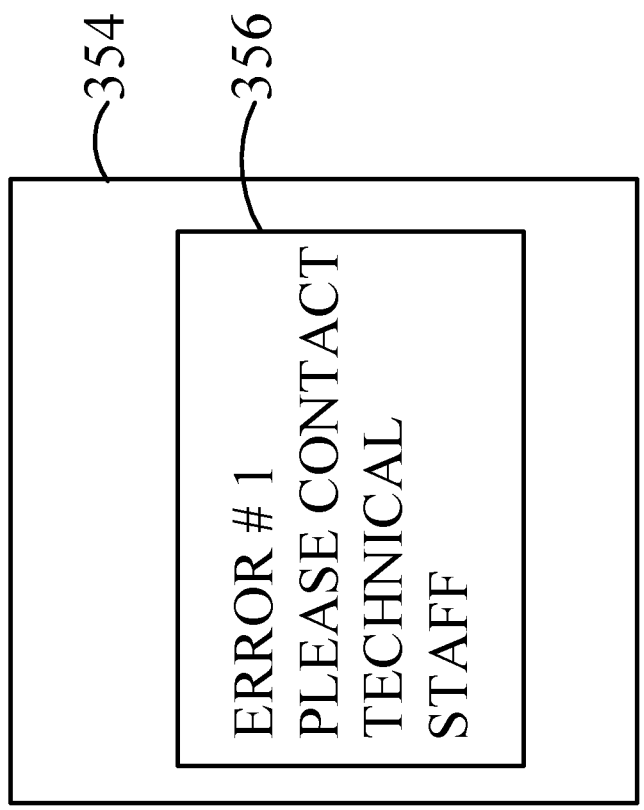

According to FIG.5B and FIG.5C, after the player finishes the round of the game, as shown in game screens 328 and 340 of two different type of games (GAME A and GAME B), grey parts 328 and 342 represent the selections of the player in the round of the game. Printed game draw 338 and 352 respectively on coupon 334 and 348 may provide the player to verify the actual game draws 332 and 344 and printed game draws 338 and 352. By the preprinting mechanism, the impression of the game coupon 334 and 348 in some games provide the player guarantee of the existence of at least one winning combination, previously to any selection that the player must do.

Figure 7:
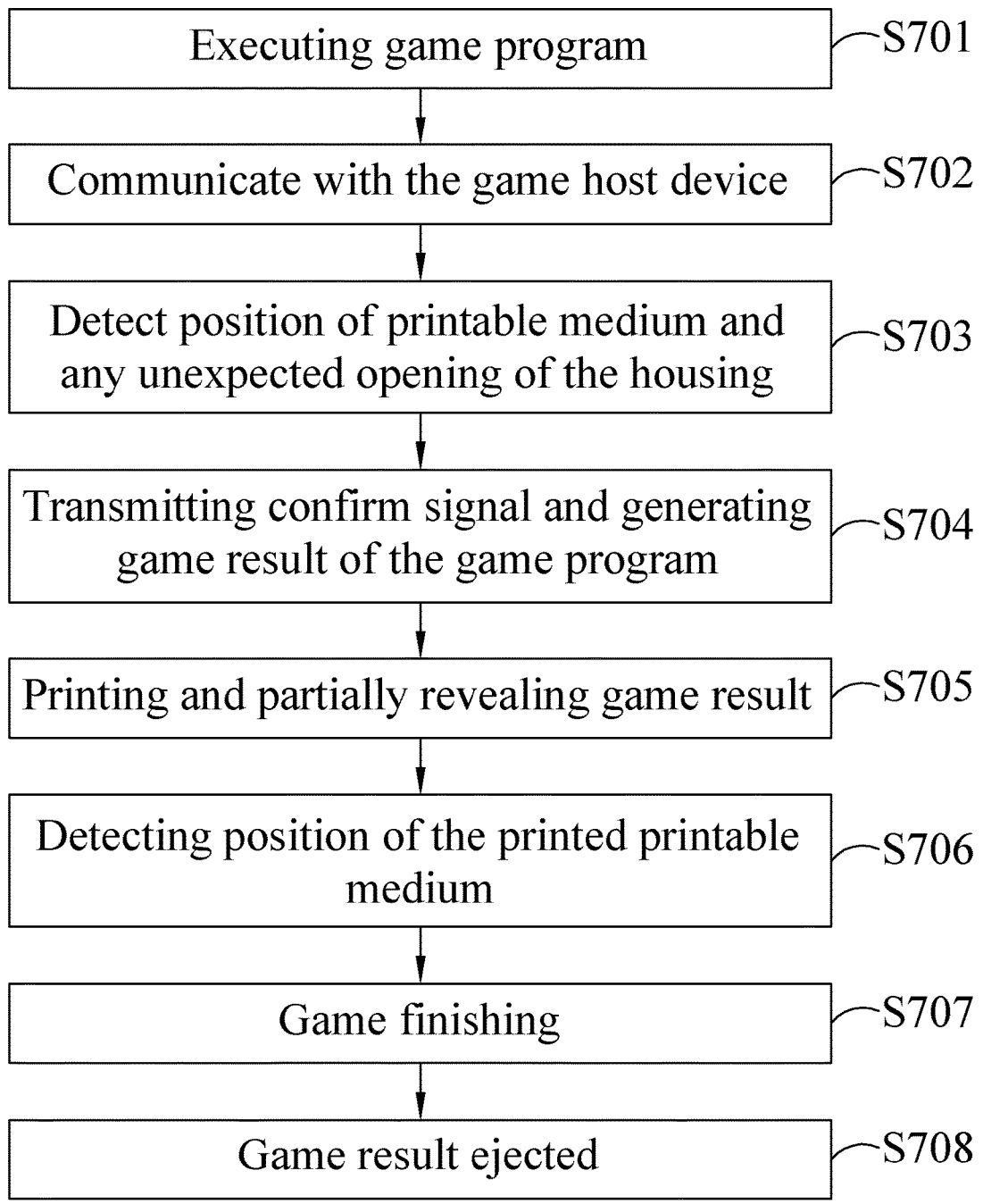
FIGS. 7 and 8 are flow charts subsequently illustrating the exemplary embodiment of the preprinting method according to the present invention.
Figure 8:
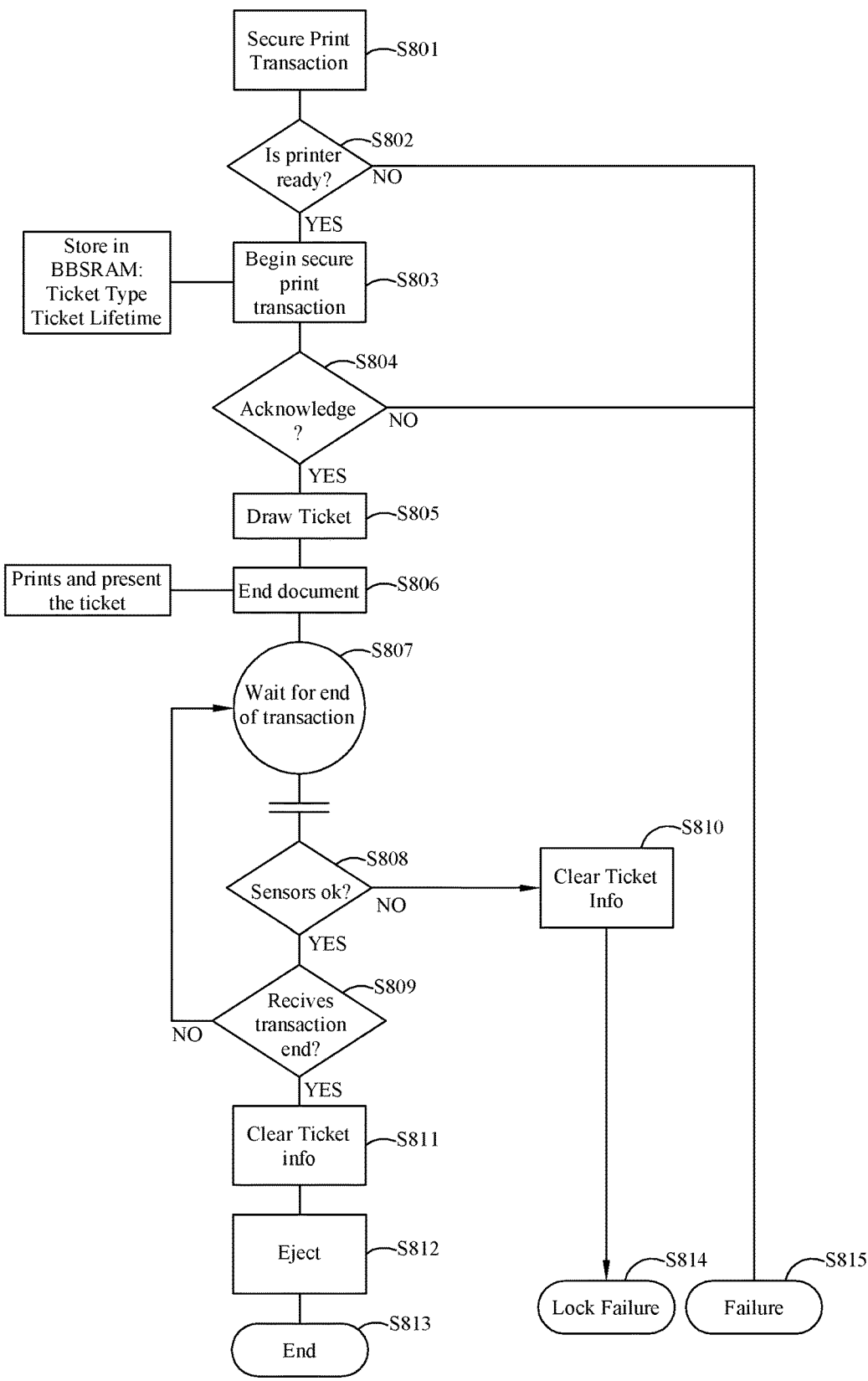

FIGS. 7 and 8 are flow charts subsequently illustrating the exemplary embodiment of the preprinting method according to the present invention. According to FIG. 7 and FIG. 8, a preprinting method of secured information applicable to the preprinting system is provide, the method comprises following steps:

Steps 701: the game host device being configured to execute the gaming program and generating a status checking signal request and a game information signal;

Step 702: using the controller to communicate with the game host device and receive the game information signal and the status checking request signal;

Step 703: using the controller to control the plurality of printer detectors to detect a position of the printable medium according to the status checking request signal and to control the plurality of the housing detectors to detect any unexpected opening of the housing;

Step 704: using the controller to transmit a confirm signal if the printable medium is correctly printed and the housing is closed, and then at least one game draw of the game program is generated after the game host device receives the confirm signal;

Step 705: using the controller to receive the at least one game draw to control the printer to print the game draw on the printable medium before a game associated to the at least game draw is started, and the printed printable medium being partially revealed to the player while the game draw is unknown to the player;

Step 706: using the controller to control the plurality of printer detectors to detect a position of the printed printable medium according to the status checking request signal;

Step 707 and S708: using the controller to control the printer to eject the printed printable medium according to the game information signal after the game is finished.

In FIG. 8, the preprinting method of secured information applicable to the preprinting system is provide in more detail, the method comprises following steps:

Step S801: performing the secure print transaction by the game host device;

Step S802: determining the printer is ready or not by transmitting a status checking request signal to the preprinting system, if yes, entering steps S803, if no, entering step;

Step S803: beginning the secure print transaction described in FIG. 6;

Step S804: checking the status of the preprinting system;

Step S805: using the controller to control the printer to print at least one draw of the game program;

Steps S806: using the game host device to send the end document command according to FIG. 6, the printable medium is printed and partially presented;

Step S807: wait for end of the game;

Step S808: checking the status of the preprinting system;

Step S809: determining the preprinting system receives transaction end commands or not, that is, determining the game is correctly finished or not, if yes, entering step S811, if no, entering step S810;

Step S811: clear all the ticket information stored in the memory unit of the preprinting system;

Step S812: ejecting the printed printable medium from the printer;

Step S813: ending, player gets the ticket.

Step S810; clear all the ticket information stored in the memory unit of the preprinting system;

Step S814: the armor of the preprinting system locked.

As the aforementioned description, the present invention provides an information securing gaming system and method with the guarantee of the existence of winning combination before any selection that the player made, and the information security mechanism is also exist in the same system and method.

Obviously, the present invention has made a breakthrough and definitely accomplished the desired improved effect which is not easily to think of by a skilled person in the art; moreover, the present invention has not been published prior to the file of the patent application, and the inventiveness, practicability thereof both conform with the patentability, and the patent application is hereby provided in accordance with the regulations.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A preprinting system of secured information connected to a game host device, which is configured to execute a game program, comprising:

a controller configured to communicate with the game host device, and to receive a game information signal and a status checking request signal from the game host device after a player operates the game host device to start a game of the game program;

a printer electronically connected to the controller, configured to be controlled by the controller to print a game draw of the game of the game program on a printable medium stored therein, wherein after the game draw of the game is entirely printed on the printable medium, a portion without the game draw of the printable medium is revealed to the player while the game draw thereon is hidden from the player;

a plurality of printer detectors disposed on the printer and electronically connected to the controller, and the controller being configured to control the plurality of the printer detectors to check the position of the printable medium and to sense any unexpected movement of the printable medium in real time according to the status checking request signal;

a housing disposed to enclose the printer to protect the printer from exterior forces and to protect the printable medium from being contacted by the user when the portion without the game draw of the printed printable medium is revealed to the player and the entire game draw is printed on the printed printable medium, wherein the entire game draw on the printable medium is hidden from the player under a protection of the housing;

a plurality of housing detectors disposed between the printer and the housing and electronically connected to the controller, and the controller being configured to detect any unexpected opening of the housing by the plurality of housing detectors;

wherein the controller transmits a confirm signal to the game host device if the printable medium is correctly printed and the housing is kept closed, then the game draw of the game of the game program is generated after the game host device receives the confirm signal, and the controller is configured to receive a signal including the game draw from the game host device to control the printer to print the entire game draw on the printable medium before a game associated to the at least one game draw is set to be started, the printer is configured to print out the entire game of the game on the printable medium and move the printed printable medium into the housing, such that the portion without the game draw of the printable medium is revealed to the player for exhibiting that the entire game draw is printed when the game is set to be started, after the game is finished by the player, the controller is configured to perform a finishing verification by sending a verification signal to the game host device to confirm the game is finished correctly at the game host device, if the finishing verification is passed, the controller is configured to control the printer to eject the printed printable medium with the entire game draw out of the housing according to the game information signal and to terminate the game, and the player is allowed to confirm the entire game draw after the game is terminated.

2. The preprinting system of claim 1, wherein the controller is configured to determine whether the position of printed printable medium is correct in real time through the plurality of the printer detectors, if "No", the controller will transmit an error signal to the game host device, and the game program executed by the game host device goes to an error condition immediately according to the error signal.

3. The preprinting system of claim 1, wherein the controller is configured to determine whether the position of the housing is correct in real time by the plurality of the housing detectors, if "No", the controller is configured to transmit a lock signal to the game host device, and the game program executed by the game host device goes to an error condition immediately according to the lock signal.

4. The preprinting system of claim 1, further comprising a memory, which is configured to store records generated by the plurality of the printer detectors, the housing detector and the controller.

5. The preprinting system of claim 4, wherein the printed printable medium is a ticket, and the records comprising a unique ticket ID, a ticket type, and life time of the ticket.

6. The preprinting system of claim 4, wherein the records comprising data of the plurality of the printer detectors and the plurality of the housing detectors.

7. The preprinting system of claim 1, further comprising a battery, which is configured to supply power to the printer detectors, the housing detector, and the controller memory when a power supply for the preprinting system from outside is interrupted.

8. The preprinting system of claim 1, wherein data transmission between the game host device and the controller is configured to be encrypted by the game host device and the controller.

9. The preprinting system of claim 1, wherein the housing further comprises:
an armor comprised of a lock door and a cover, the cover is disposed on the printer, and the armor is movably disposed outside of the printer and the cover to protect the printer and the cover.

10. The preprinting system of claim 9, wherein the plurality of the housing detectors further comprises:
a lock detector configured to detect a locking status of the lock;
an armor detector configured to detect an armor position; and
a cover detector configured to detect a cover position.

11. A preprinting method of secured information for a gaming system applicable to a preprinting system of secured information, the preprinting system of secured information connected to a game host device, which is configured to execute a game program, comprising: a controller configured to communicate with the game host device, and to receive a game information signal and a status checking request signal from the game host device after a player operates the game host device to start a game of the game program; a printer electronically connected to the controller, configured to be controlled by the controller to print a game draw of the game of the game program on a printable medium stored therein, wherein after the game draw is entirely printed on the printable medium, a portion without the game draw is revealed to the player while the game draw thereon is hidden from the player; a plurality of printer detectors disposed on the printer and electronically connected to the controller, and the controller being configured to control the plurality of the printer detectors to check the position of the printable medium and to sense any unexpected movement of the printable medium in real time according to the status checking request signal; a housing disposed to enclose the printer to protect the printer from exterior forces and to protect the printable medium from being contacted by the user when the portion without the game draw of the printed printable medium is revealed to the player and the entire game draw is printed on the printed printable medium, wherein the game draw on the printable medium is hidden from the player under a protection of the housing; a plurality of housing detectors disposed between the printer and the housing and electronically connected to the controller, and the controller being configured to detect any unexpected opening of the housing by the plurality of housing detectors; wherein the controller transmits a confirm signal to the game host device if the printable medium is correctly printed and the housing is kept closed, then at least one game draw of the game of the game program is generated after the game host device receives the confirm signal, and the controller is configured to receive a signal including the game draw from the game host device to control the printer to print the entire game draw on the printable medium before a game associated to the at least one game draw is set to be started, the printer is configured to print out the entire game of the game on the printable medium and move the printed printable medium into the housing, such that the portion without the game draw of the printable medium is revealed to the player for exhibiting that the entire game draw is printed before the game is started, after the game is finished by the player, the controller is configured to perform a finishing verification by sending a verification signal to the game host device to confirm the game is finished correctly at the game host device, if the finishing verification is passed, the controller is configured to control the printer to eject the printed printable medium with the entire game draw out of the housing according to the game information signal and to terminate the game, and the player is allowed to confirm the entire game draw after the game is terminated, and the method comprises the following steps:
using the controller to communicate with the game host device and receive the game information signal and the status checking request signal after a player operates the game host device to start a game of the game program;

using the controller to control the plurality of printer detectors to detect a position of the printable medium and to sense any unexpected movement of the printable medium in real time according to the status checking request signal from the game host device after a player operates the game host device to start a game of the game program;
  using the controller to control the plurality of the housing detectors to detect any unexpected opening of the housing according to the status checking request signal;
  using the controller to transmit a confirm signal if the printable medium is correctly printed and the housing is kept closed, and then at least one game draw of the game of the game program is generated after the game host device receives the confirm signal;
  using the controller to receive the signal including the at least one game draw to control the printer to print the entire game draw on the printable medium and to move the printed printable medium into the housing when a game associated to the at least game draw is set to be started, after the entire game draw is printed and moved into the housing, the printed printable medium being partially revealed to the player while the game draw is hidden from the player by the housing, wherein the portion without the game draw of the printable medium is revealed to the player for exhibiting that the entire game draw is printed when the game is started;
  using the controller to control the plurality of printer detectors to detect a position of the printed printable medium according to the status checking request signal;
using the controller to perform a finishing verification by sending a verification signal to the game host device to confirm the game is finished correctly at the game host device after the game is finished by the player;
  using the controller to control the printer to eject the printed printable medium with the entire game draw out of the housing according to the game information signal if the finishing verification is passed after the game is finished, wherein the player is allowed to confirm the entire game draw after the game is terminated.

12. The preprinting method of claim 11, wherein the controller is configured to determine whether the position of printed printable medium is correct in real time through the plurality of the printer detector, if "No", the controller will transmit an error signal to the game host device, and the game program executed by the game host device goes to an error condition immediately according to the error signal.

13. The preprinting method of claim 11, wherein the controller is configured to determine whether the position of the housing is correct in real time by the plurality of the housing detectors after the game draw is printed, if "No", the controller is configured to transmit a lock signal to the game host device, and the game program executed by the game host device goes to an error condition immediately according to the lock signal.

14. The preprinting method of claim 11, further comprising:
  using a memory to store records generated by the plurality of the printer detectors, the housing detector and the controller.

15. The preprinting method of claim 14, wherein the printed printable medium is a ticket, and the records comprising a unique ticket ID, a ticket type, and life time of the ticket.

16. The preprinting method of claim 14, wherein the records comprising data of the plurality of the printer detectors and the plurality of the housing detectors.

17. The preprinting method of claim 14, further comprising:
  using a battery to supply power to the printer detectors, the housing detector, and the controller memory when a power supply for the preprinting system from outside is interrupted.

18. The preprinting method of claim 11, wherein data transmission between the game host device and the controller is configured to be encrypted by the game host device and the controller.

19. The preprinting method of claim 11, further comprising:
  disposing a cover of an armor of the housing on the printer; and
  disposing the armor outside of the printer and the cover to protect the printer and the cover, wherein the armor has a lock door and the cover.

20. The preprinting method of claim 19, comprising:
using a lock detector to detect a locking status of the lock;
using an armor detector to detect an armor position; and
using a cover detector to detect a cover position.

* * * * *